United States Patent [19]

Harrington et al.

[11] E Re. 31,018

[45] Reissued Aug. 24, 1982

[54] METHOD AND APPARATUS FOR SHIELDING THE EFFLUENT FROM PLASMA SPRAY GUN ASSEMBLIES

[75] Inventors: John H. Harrington, Warwick; Richard T. Smyth; John D. Weir, both of Huntington, all of N.Y.

[73] Assignee: Metco Inc., Westbury, N.Y.

[21] Appl. No.: 206,589

[22] Filed: Nov. 13, 1980

Related U.S. Patent Documents

Reissue of:

[64] Patent No.: 4,121,082
Issued: Oct. 17, 1978
Appl. No.: 791,478
Filed: Apr. 27, 1977

[51] Int. Cl.[3] ..... B23K 9/00

[52] U.S. Cl. ..... 219/121 PL; 219/75; 219/76.16; 219/121 PM; 219/121 PN; 219/121 PY

[58] Field of Search ..... 219/121 PL, 121 PM, 219/121 PN, 121 PQ, 121 PY, 76.16, 75; 427/34

[56] References Cited

U.S. PATENT DOCUMENTS

| | | | |
|---|---|---|---|
| 2,887,562 | 5/1959 | Mencutti | 219/75 |
| 3,082,314 | 3/1963 | Arata | 219/75 |
| 3,373,306 | 3/1968 | Karlovitz | 219/75 X |
| 3,470,347 | 9/1969 | Jackson | 219/76.16 X |
| 3,471,675 | 10/1969 | Sargent | 219/75 |
| 3,969,603 | 7/1976 | Boughton | 219/121 PQ |

FOREIGN PATENT DOCUMENTS

| | | |
|---|---|---|
| 1385480 | 2/1975 | United Kingdom . |
| 1433137 | 4/1976 | United Kingdom . |

*Primary Examiner*—Elliot A. Goldberg
*Attorney, Agent, or Firm*—S. A. Giarratana; E. T. Grimes; J. D. Crane

[57] ABSTRACT

Method and apparatus for plasma flame-spraying coating material onto a substrate by means of passing a plasma-forming gas through a nozzle electrode, passing an arc-forming current between said nozzle electrode and a rear electrode to form a plasma effluent, introducing spray coating material into the plasma effluent, passing the plasma effluent axially through a wall shroud extending from the exit of said nozzle electrode and forming a hot gas shroud for the plasma effluent at least within the wall shroud.

47 Claims, 8 Drawing Figures

TABLE OF PLASMA SPRAY GUN TEST RESULTS

| TYPE OF PLASMA SPRAY GUN | SHROUD GAS | SHROUD GAS FLOW - S.C.f.h. | SHROUD GAS TEMP. °F | UNMELTED PARTICLES-% | OXIDE % |
|---|---|---|---|---|---|
| CONVENTIONAL | NONE | — | — | 1 | 16 |
|  | NO SHROUD GAS | — | — | 1 | 16 |
| (REVERSE FLOW)  | AIR | 1000 TO 2000 | RT TO 1000 | 0 | 16 |
| | $N_2$ | 1000 | RT | 0 | 9 |
| | $N_2$ | 2000 | RT | 2 | 3 |
| | $N_2$ | 1000 | 1000 | 0 | 6 |
| | $N_2$ | 1800 | 700 | 1 | 2 |
| | $H_e$ | 1500 | RT | 3 | 3 |
| | $H_e$ | 1500 | 900 | 2 | 2 |

NOTE: ALL TESTS PERFORMED WITH A COBALT BASE ALLOY COATING AT A FLOW RATE OF 6 LBS./HR

RT = ROOM TEMPERATURE

METHOD AND APPARATUS FOR SHIELDING THE EFFLUENT FROM PLASMA SPRAY GUN ASSEMBLIES

Matter enclosed in heavy brackets [ ] appears in the original patent but forms no part of this reissue specification; matter printed in italics indicates the additions made by reissue.

*This Application is a Reissue Application of Pat. No. 4,121,082, issued Oct. 17, 1978.*

BACKGROUND OF THE INVENTION

This invention relates to the application of coatings onto substrates by plasma spray techniques, and more particularly, to method and apparatus for shielding the effluent from plasma spray gun assemblies from contamination by the surrounding environment.

Plasma spray gun assemblies are known which use an electric arc to excite a gas, thereby producing a thermal plasma or very high temperature. Spray or powdered materials are introduced into the thermal plasma, melted and projected onto a substrate or base to form coatings. Such powdered materials may include metals, metal alloys, ceramics such as metal oxides, and carbides or the like, for example.

Heretofore, difficulties were experienced due to contamination of the effluent from the nozzle of the spray gun, such as air entrapment, for example, that resulted in significant oxidation of the coating materials. The spraying conditions, particularly heat and velocity, were often adjusted to a compromise to heat the powder just enough to melt it. Attempts have been made to overcome this problem, but they have been only moderately successful. One such attempt involved completely enclosing the apparatus in a chamber, but this was expensive and also very cumbersome. In other installations, efforts were made to use a gas shroud to solve the problem. For example, the Jackson U.S. Pat. No. 3,470,347 shows the use of a coaxial annular stream of unheated gas. However, this required a relatively large flow of gas, such as argon, which is expensive. In addition, there was a tendancy with such prior art devices to build up a coating on the shrouding device. Other related patents in this art include Anderson et al, U.S. Pat. No. 2,951,143; Yoshiaki Arata et al, U.S. Pat. No. 3,082,314; and Unger et al, U.S. Pat. No. 3,313,909, for example.

SUMMARY OF THE INVENTION

The basic and general object of the present invention is the provision of a new and improved method and apparatus, which overcomes or at least mitigates some of the problems of the prior art.

A more specific object is the provision of method and apparatus which provides improvements in one or more of the following aspects: higher deposition efficiency; reduced oxygen content in the effluent for metallic materials; reduced unmelted particle inclusions; increased feed rates; and improved quality of the coating.

To the accomplishment of the foregoing objectives, and additional objectives and advantages, which will become apparent as this description proceeds, the invention contemplates, in one form thereof, the provision of a new and improved plasma spray gun assembly for coating substrates which includes, in combination, a nozzle electrode having a nozzle passage therethrough, a rear electrode, and means for passing plasma-forming gas through the nozzle electrode. In addition, the assembly includes means for passing an arc-forming current between the electrodes to form a plasma effluent, and means for introducing coating material into the plasma effluent. Further, the assembly according to the invention, includes a wall shroud for the plasma effluent extending from the exit of the nozzle electrode, and means for forming a hot gas shroud for the plasma effluent within the wall shroud and in some instances extending beyond the wall shroud.

In one preferred form of the invention, the hot gas shroud is directed at an angle of between about 160° and about 180° with respect to the axis of the plasma effluent, and more preferably, the hot gas shroud is directed at an angle of about 180° with respect to the axis of the plasma effluent.

According to an aspect of the invention, the wall shroud is cylindrical and means are provided for water cooling this shroud.

According to another aspect of the invention, the means for forming a hot gas shroud for the plasma effluent at least within the wall shroud comprises means for preheating the gas for said hot gas shroud, which in various forms include an electric gas preheater, a second plasma flame gun assembly serving as a gas preheater, or an internal passageway in the wall shroud which serves as a gas preheater.

In another form of the invention, an annular manifold is mounted adjacent the outer end of the wall shroud, which has jet orifice means for providing an annular curtain effect around the plasma flame as it leaves the wall shroud and passes towards the target substrate.

The invention, in another form thereof, is directed to a process for plasma flame-spraying coating material onto a substrate, which includes the steps of: passing a plasma-forming gas through a nozzle electrode, and passing an arc-forming current between the nozzle electrode and a rear electrode to form a plasma effluent. The process further includes the steps of introducing coating material into the plasma effluent, passing the plasma effluent through a wall shroud extending from the exit of the nozzle electrode, and forming a hot gas shroud for the plasma effluent at least within the wall shroud. It will be appreciated that the coating material may be in any form suitable for plasma spraying such as, for example, a solid wire or rod. However, powder is preferable. The powder may be free flowing or in a binder such as a plastic bonded wire or the like, for example. The spray material introduced into the plasma effluent may be introduced at any convenient location, including one upstream of the arc. However, it is generally introduced at a point downstream of the arc, and preferably, downstream adjacent the nozzle exit. Further, several points of introduction may be utilized simultaneously.

According to the invention, the hot gas shroud is preferably directed at an angle of about 180° with respect to the axis of the plasma effluent. Preferably, the gas for forming the hot gas shroud is preheated to a temperature above about 300° C. and, more preferably, the gas is preheated to a temperature of between about 500° C. and about 1000° C. In a preferred form of the invention, the gas is a reducing gas or an inert gas selected from the group consisting of nitrogen, argon and helium, and in some installations, a small amount of combustion gas is added. Preferably, the flow rate of the hot gas is above about 500 cubic feet per hour and, more preferably, the flow rate is between about 1000 cubic feet per hour and about 2000 cubic feet per hour at a temperature of about 500° C.

As another aspect of the invention, the process includes the step of forming an annular fluid curtain around the plasma effluent as it leaves the wall shroud and passes towards the target substrate.

There has thus been outlined rather broadly the more important features of the invention in order that the detailed description thereof that follows may be better understood, and in order that the present contribution to the art may be better appreciated. There are, of course, additional features of the invention which will be described more fully hereinafter. Those skilled in the art will appreciate that the conception on which this disclosure is based may readily be utilized as the basis for the design of other methods and apparatus for carrying out the several purposes of the invention. It is important, therefore, that this disclosure be regarded as including such equivalent methods and apparatus as do not depart from the spirit and scope of the invention.

Several embodiments of the invention have been chosen for purposes of illustration and description, and are shown in the accompanying drawings, forming a part of the specification.

DETAILED DESCRIPTION OF THE PREFERRED EMBODIMENTS

Figure 1:
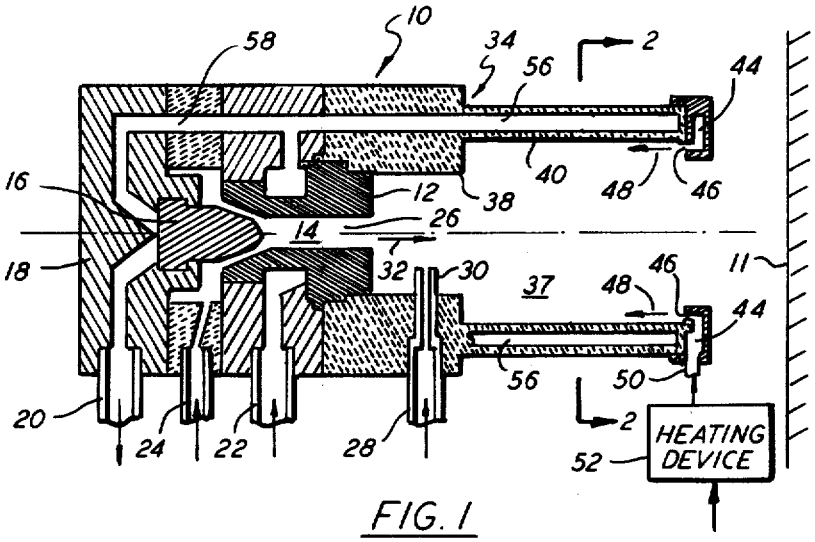
FIG. 1 is a medial sectional view of a plasma flame spray gun assembly constructed in accordance with the concepts of the present invention.
Figure 2:
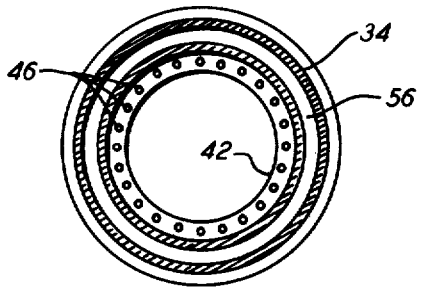
FIG. 2 is a sectional view taken along the line indicated at 2—2 in FIG. 1.

In the embodiment of the invention illustrated in FIG. 1, a plasma spray gun assembly, indicated generally at 10, for coating a substrate 11, includes a nozzle electrode 12 having a nozzle bore or passage 14 therethrough, and a rear electrode 16 mounted on an electrode holder 18. Electrical cable connections 20 and 22 serve to connect the electrodes to a suitable electrical source. A plasma-forming gas such as nitrogen, argon, helium, hydrogen or the like, for example, is passed from a suitable pressure source through a connector 24 into the space 14 around the tip of the electrode 16, through an annular passage formed by the electrode tip and the tapered portion of the nozzle. The current is caused to flow from the connector 20 through the electrode holder 18 to the electrode 16 and from the tip of the electrode 16 in the form of an arc to the nozzle 12 and then to connector 22, to thereby form a very hot plasma flame which extends out through the exit 26 of the nozzle electrode 12. One or more secondary gases can be mixed with the primary gas, if desired.

Heat fusible powdered coating material, such as powdered metal, or ceramics or the like, for example, is entrained in a carrier gas, which, for example, may be a gas such as nitrogen, helium, argon, or even air, received from a suitable source through a connection 28 provided for the purpose. In the embodiment illustrated, the powdered material is injected into the plasma flame adjacent the nozzle exit 26, as by means of a nozzle 30. As a result in operation, the plasma effluent or flame with the powdered material carried therewith passes in the direction indicated by arrow 32 at a very high velocity, the axis thereof being indicated at 33.

According to the invention, an annularly-shaped wall shroud, indicated at 34, is mounted on the nozzle 12 adjacent the nozzle exit 36 to form a shroud chamber 37. In the embodiment illustrated, the wall shroud 34 is cylindrical, having an inner step portion 38 and an outer step portion 40.

Still referring to FIG. 1, an annular plenum chamber 44 is mounted at the outer end of the wall shroud 34 for feeding a plurality of jet orifices 46 that are directed at an angle of between about 160° and about 180° with respect to the axis 33 of the plasma effluent or flame. Preferably, the jet orifices are directed at an angle of about 180° with respect to the axis 33 of the plasma effluent to form an annularly-shaped hot gas shroud within the chamber, adjacent the wall shroud, as indicated by arrows 48. The gas forming this hot gas shroud is flowing at a high velocity and is in a turbulent state. Alternatively, the jet orifices may be in the form of a continuous narrow annular slit-like opening. The hot gas for the hot gas shroud is fed to the plenum chamber 44 through an inlet 50 from a heating device 52. The gas is heated in the heating device to a temperature above about 300° C., with the upper limit being 2000° C. or above, the actual upper limit being determined by the materials employed. The preferable temperature range is between about 500° C. and about 1000° C. Any suitable type of inert or reducing gas may be employed such as, nitrogen, argon or helium, for example. In some installations, a small quantity of combustion gas, less than 50%, may be added as a getter agent for oxygen in the environment. Suitable combustion gases include propane or hydrogen, for example. The flow rate of the hot gas in the hot gas shroud is above about 500 cubic feet per hour and preferably from about 1000 cubic feet per hour to about 2000 cubic feet per hour at a temperature of about 500° C. The flow rate of the gas is inversely dependent upon the temperature so that the higher the temperature of the gas, the lower the flow rate required.

The heating device 52 may be of any suitable type such as, for example, an electric heater. A plasma flame gun assembly similar to that described hereinbefore, but without the addition of the powdered coating material, is particularly desirable for use as a hot gas source.

Due to the high temperatures involved with plasma spray guns of this nature, water cooling may be provided. In such an installation, the electrical cable connections 20 and 22 are constructed so as to receive water cooled electric cables through which cooling water is forced. This cooling water flows through the connection 22 and around the nozzle 12, and then outwardly through one side and then inwardly through the other side of a water jacket 56 to cool the wall shroud 34. The cooling water thereafter is directed through a passage 58 to cool the electrode 16 before passing out of the system through the connection 20.

It will be appreciated that the hot gas shroud, as indicated by arrow 48, within the wall shroud 34 is directed towards the exit flow of the arc plasma flame, as indicated by arrow 32. The combination of these two flows, together with the high temperature of the gases satisfies the arc plasma jet's characteristic aspiration of the surrounding atmosphere without the plasma jet being either quenched by a cold gas stream or entraining air, which otherwise has a propensity to produce an uncontrolled oxidizing reaction with the material being sprayed. The characteristics of the gas supplied to the plenum chamber 44 are controlled. Depending on the particular material being sprayed, these gases may be adjusted to provide either oxidizing, neutral or reducing atmosphere both within the chamber 37 and beyond the exit thereof. This enables the chemical composition of the spray coating to be controlled such as, for example, controlling the carbon content of carbides, iron or the like and, also, compounds such as barium titanate may be sprayed without the usual reduction of oxygen content. In general, the spraying of metals requires a reducing atmosphere, whereas when spraying ceramics, it is desirable to provide an excess of oxygen.

Figure 3:
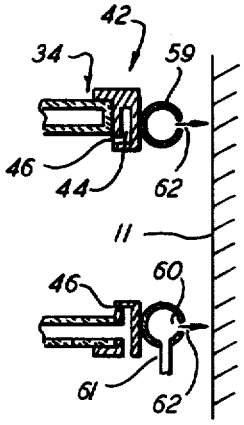
FIG. 3 is a fragmentary, medial sectional view showing the outlet portion of the plasma flame spray gun, according to still another embodiment of the invention.

In certain installations, an annular manifold 59, FIG. 3, is mounted on the outer end of the gas burner 412. Cooling water or an inert gas such as, for example, nitrogen or argon is supplied to this manifold through an inlet 61, and annular jet orifice outer means 60 are provided on the side of the manifold towards the substrate 11 to provide an annular curtain effect around the plasma flame, as indicated by arrow 62. Not only does the jet spray serve to shield the spray stream, it also allows the spray cone to be controlled and furthermore serves to provide some cooling of the substrate. Similarly, the same manifold may be used with propane to provide a secondary flame shroud around the spray stream and thereby further reduce the oxide content of the coating. In certain installations it is desirable to utilize carbon dioxide for this purpose.

Figure 4:
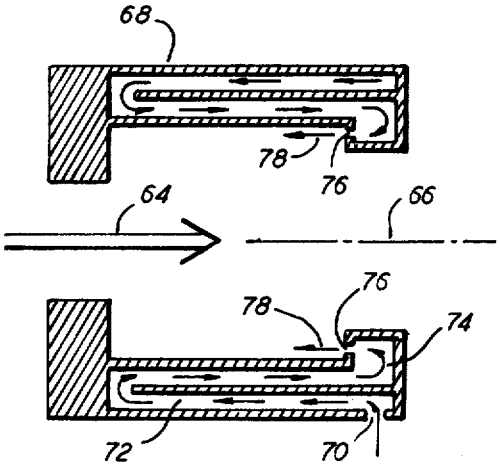
FIG. 4 is a medial sectional view of a plasma flame spray gun assembly according to another embodiment of the invention.

FIG. 4 shows another embodiment of the invention wherein the gas for the hot gas shroud is preheated by a regenerative process, in which the plasma effluent, itself, heats the wall shroud. The plasma effluent 64 passes longitudinally along its axis 66 through an annular wall shroud 68. The wall shroud has an inlet 70 for receiving the gas and an internal passageway 72 of generally serpentine configuration leading to an annular plenum chamber 74 located towards the outer end of the wall shroud. The plenum chamber feeds a plurality of jet orifices 76 or other suitable nozzle-like apertures to direct the flow of hot gas, as indicated by arrow 78, at an angle of between about 160° and about 180°, preferably about 180°, with respect to the axis 66 of the plasma effluent 64. In operation, the gas is heated as it flows through the internal passageway 72 so that by the time it is discharged through the jet orifices 76, the temperature thereof is in the desired ranges, as set forth hereinbefore in connection with the embodiment of FIG. 1.

Figure 5:
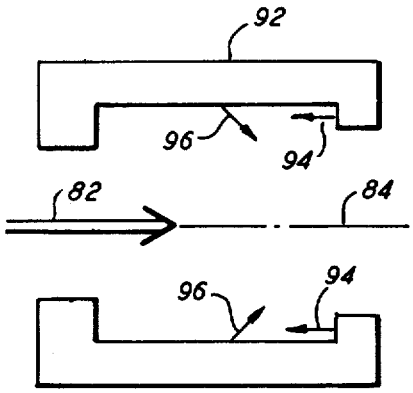
FIGS. 5 to [9] *7* are schematic drawings each showing a wall shroud and hot gas shroud arrangement according to other embodiments of the invention; and FIG. [10] *8* is a table showing comparative test results of a plasma flame spray gun according to the invention with respect to conventional guns.

While the embodiments of FIGS. 1 and 4 are the presently preferred embodiments, other desirable embodiments of the invention are illustrated in FIGS. 5 to [9. FIG. 5 shows in schematic form an annular wall shroud 80 with plasma flame or effluent 82 passing longitudinally therethrough along an axis indicated at 84. In this embodiment, an annular hot gas shroud 86 is directed parallel to the direction of flow of the plasma effluent.

Figure 6:
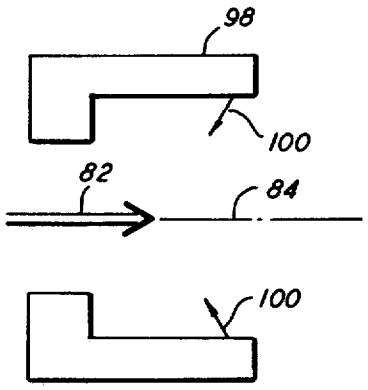
Figure 7:
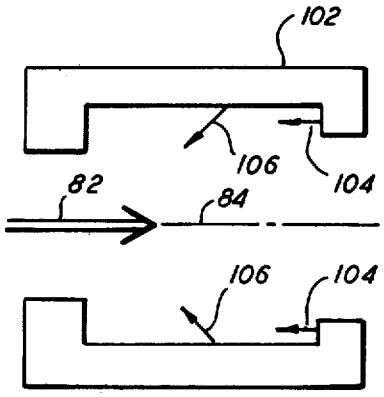
Figure 8:
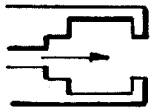
Figure 8:
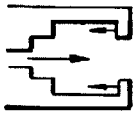

In the embodiment of FIG. 6, the plasma effluent 82 passes longitudinally along its axis 84 through an annular wall shroud 88, and an annular hot gas shroud 90 is directed at an angle having a component extending parallel to the direction of flow of the plasma effluent.] *7.*

Referring next to the embodiment of FIG. [7] *5*, the plasma effluent 82 passes longitudinally along its axis 84 through an annularly-shaped wall shroud 92, and a portion of the gas for forming the hot gas shroud is introduced, as indicated at 94, at an angle of about 180° with respect to the axis 84 of the plasma effluent, and a second portion of the gas for forming the hot gas shroud is introduced, as indicated at 96, at an angle having a component extending parallel to the direction of flow of the plasma effluent.

In the embodiment of FIG. [8] *6*, the plasma effluent 82 passes longitudinally along its axis 84 through an annular wall shroud 98, and an annular hot gas shroud 100 is directed at an angle having a component extending in a direction opposite to the direction of flow of said plasma effluent.

FIG. [9] *7* shows an embodiment of the invention wherein the plasma effluent 82 passes longitudinally along the axis 84 through an annular wall shroud 102. A portion of the gas for forming the hot gas shroud is introduced, as indicated at 104, at an angle of about 180° with respect to the axis 84 of the plasma effluent and a second portion of the gas for forming said hot gas shroud is introduced, as indicated at 106, at an angle having a component extending in a direction opposite to the direction of flow of the plasma effluent.

It will be appreciated that the characteristics of the hot gas as set forth in detail in connection with the embodiment of FIG. 1 are applicable to the embodiments of FIGS. 4 to [9] *7.*

Thus, it will be appreciated that the gas for forming the hot gas shroud may be introduced at one or more inlets and each inlet may be disposed at any angle from about zero to about 180° [, and may even be normal to the direction of flow of the plasma effluent].

In order to more fully illustrate the nature of the invention, FIG. [10] *8* presents a table indicating the comparative test results, spraying the same material, of a conventional plasma spray gun assembly without shrouding and a plasma spray gun assembly constructed according to the invention. The test results show a clear superiority of the spray gun assembly of the present invention.

It will thus be seen that the present invention does indeed provide a new and improved plasma spray gun assembly which is superior to conventional spray guns with respect to deposition efficiency, reduced oxide contents, reduced unmelted particle inclusions, as well as other operative characteristics.

Having thus described the invention with particular reference to the preferred forms thereof, it will be obvious to those skilled in the art to which the invention pertains, after understanding the invention that various changes and modifications may be made therein without departing from the spirit and scope of the invention, as defined by the claims appended hereto.

What is claimed is:

1. A plasma spray gun assembly for coating substrates comprising, in combination:

a nozzle electrode having a nozzle passage therethrough;

a rear electrode;

means for passing plasma-forming gas through the nozzle electrode;

means for passing an arc-forming current between said electrodes to form a plasma effluent;

means for introducing spray coating material into the plasma effluent;

a wall shroud for said plasma effluent extending from the exit of the nozzle electrode; and means for forming a hot gas shroud for said plasma effluent at least within the wall shroud *directed at an angle such that the gas has a component of flow extending in a direction opposite to the direction of flow of the plasma effluent.*

2. A plasma spray gun assembly according to claim 1 wherein said spray coating material is in the form of a powder.

3. A plasma spray gun assembly according to claim 1 wherein said means for forming a hot gas shroud for said plasma effluent at least within the wall shroud comprises means for directing said hot gas shroud at an angle of between about 160° to about 180° with respect to the axis of the plasma effluent.

4. A plasma spray gun assembly according to claim 1 wherein said means for forming a hot gas shroud for said plasma effluent at least within the wall shroud comprises means for directing said hot gas shroud at an angle of about 180° with respect to the axis of the plasma effluent.

5. A plasma spray gun assembly according to claim 4 wherein said means for forming a hot gas shroud for said plasma effluent at least within the wall shroud includes an annular plenum chamber having jet orifice means directed at an angle of about 180° with respect to the axis of the plasma effluent.

6. A plasma spray gun assembly according to claim 1 further comprising means for water cooling said wall shroud.

7. A plasma spray gun assembly according to claim 1 wherein said wall shroud is of cylindrical configuration.

8. A plasma spray gun assembly according to claim 1 wherein said means for introducing spray coating material into the plasma effluent is disposed adjacent the exit of the electrode nozzle.

9. A plasma spray gun assembly according to claim 1 wherein said means for forming a hot gas shroud for said plasma effluent at least within the wall shroud includes an electric heater for preheating the gas for said hot gas shroud.

10. A plasma spray gun assembly according to claim 1 wherein said means for forming a hot gas shroud for said plasma effluent at least within the wall shroud includes a second plasma flame gun assembly for preheating the gas for said hot gas shroud.

11. A plasma spray gun assembly according to claim 1 wherein said means for forming a hot gas shroud for said plasma effluent at least within the wall shroud includes an internal passageway of generally serpentine configuration in said wall shroud for preheating the gas for said hot gas shroud.

12. A plasma spray gun assembly according to claim 1 wherein said means for forming a hot gas shroud for said plasma effluent at least within the wall shroud includes means for preheating the gas for said hot gas shroud to a temperature of from about 500° C. to about 1000° C.

13. A plasma spray gun assembly according to claim 1 wherein said means for forming a hot gas shroud for said plasma effluent at least within the wall shroud includes means for introducing hot gas at a flow rate of between about 1000 cubic feet per hour and about 2000 cubic feet per hour at a temperature of about 500° C. to form said hot gas shroud.

14. A plasma spray gun assembly according to claim 1 wherein said hot gas shroud is formed of an inert gas.

15. A plasma spray gun assembly according to claim 14 wherein said inert gas is selected from the class consisting of nitrogen, argon and helium.

16. A plasma spray gun assembly according to claim 15 wherein said hot gas shroud further comprises a combustible gas.

17. A plasma spray gun assembly according to claim 1 further comprising means for forming an annular curtain effect around the plasma effluent as it leaves the wall shroud and passes towards the substrate.

18. A plasma spray gun assembly according to claim 17 wherein said means for forming an annular curtain effect includes an annular manifold and orifice means mounted adjacent the outer end of said wall shroud.

[19. A plasma spray gun assembly according to claim 1 wherein said means for forming a hot gas shroud for said plasma effluent at least within the wall shroud comprises means for directing said hot gas at an angle having a component extending parallel to the direction of flow of said plasma effluent.]

[20. A plasma spray gun assembly according to claim 1 wherein said means for forming a hot gas shroud for said plasma effluent at least within the wall shroud comprises means for directing said hot gas at an angle having a component extending in a direction opposite to the direction of flow of said plasma effluent.]

21. A plasma spray gun assembly according to claim 5 further comprising second jet orifice means directed at an angle of from about zero degrees to about 180° with respect to the axis of the plasma effluent.

22. A plasma spray gun assembly according to claim 5 further comprising second jet orifice means directed at an angle having a component extending parallel to the direction of flow of said plasma effluent.

23. A plasma spray gun assembly according to claim 5 further comprising second jet orifice means directed at an angle having a component extending in a direction opposite to the direction of flow of said plasma effluent.

24. A plasma spray gun assembly according to claim 1 wherein said wall shroud has a radially-inwardly directed lip portion disposed towards the exit end thereof.

25. A process for plasma flame-spraying coating material onto a substrate, which comprises the steps of:

passing a plasma-forming gas through a nozzle electrode;

passing an arc-forming current between said nozzle electrode and a rear electrode to form a plasma effluent;

introducing coating material into the plasma effluent;

passing the plasma effluent longitudinally through a wall shroud extending from the exit of said nozzle electrode; and forming a hot gas shroud for said plasma effluent at least within the wall shroud *directed at an angle such that the gas has a component of flow extending in a direction opposite to the direction of flow of the plasma effluent.*

26. A process for plasma flame-spraying coating material onto a substrate according to claim 25 wherein said coating material is in a powder form.

27. A process for plasma flame-spraying coating material onto a substrate according to claim 25 wherein said hot gas shroud is directed at an angle of between about 160° to about 180° with respect to the axis of the plasma effluent.

28. A process for plasma flame-spraying coating material onto a substrate according to claim 27 wherein said hot gas shroud is directed at an angle of about 180° with respect to the axis of the plasma flame.

29. A process for plasma flame-spraying coating material onto a substrate according to claim 25 further comprising the step of passing cooling water through said wall shroud.

30. A process for plasma flame-spraying coating material onto a substrate according to claim 25 wherein said coating material is introduced into the plasma effluent adjacent the exit of the electrode nozzle.

31. A process for plasma flame-spraying coating material onto a substrate according to claim 25 wherein said step of forming a hot gas shroud for said plasma effluent at least within the wall shroud includes the step of passing the gas for forming said hot gas shroud through an electric preheater.

32. A process for plasma flame-spraying coating material onto a substrate according to claim 25 wherein said step of forming a hot gas shroud for said plasma effluent at least within the wall shroud includes the step of using a second plasma flame gun assembly for preheating the gas for said hot gas shroud.

33. A process for plasma flame-spraying coating material onto a substrate according to claim 25 wherein said step of forming a hot gas shroud for said plasma effluent at least within the wall shroud includes the step of passing the gas for said hot gas shroud through an internal passageway of generally serpentine configuration in said wall shroud.

34. A process for plasma flame-spraying coating material onto a substrate according to claim 25 wherein said step of forming a hot gas shroud for said plasma effluent at least within the wall shroud includes the step of preheating the gas for said gas shroud to a temperature above about 300° C.

35. A process for plasma flame-spraying coating material onto a substrate according to claim 25 wherein said step of forming a hot gas shroud for said plasma effluent at least within the wall shroud includes the step of preheating the gas for said gas shroud to a temperature of between about 500° C. and about 1000° C.

36. A process for plasma flame-spraying coating material onto a substrate according to claim 25 wherein the gas for said hot gas shroud is a reducing gas.

37. A process for plasma flame-spraying coating material onto a substrate according to claim 25 wherein the gas in said hot gas shroud is in a turbulent state.

38. A process for plasma flame-spraying coating material onto a substrate according to claim 25 wherein the gas for said hot gas shroud is an inert gas.

39. A process for plasma flame-spraying coating material onto a substrate according to claim 38 wherein said inert gas is selected from the group consisting of nitrogen, argon and helium.

40. A process for plasma flame-spraying coating material onto a substrate according to claim 25 wherein the gas for forming said hot gas shroud includes a combustible gas.

41. A process for plasma flame-spraying coating material onto a substrate according to claim 25 wherein the flow rate of said gas in said hot gas shroud is above about 500 cubic feet per hour.

42. A process for plasma flame-spraying coating material onto a substrate according to claim 41 wherein the flow rate of the gas for forming said hot gas shroud is between about 1000 cubic feet per hour and about 2000 cubic feet per hour at a temperature of about 500° C.

43. A process for plasma flame-spraying coating material onto a substrate according to claim 25 wherein said coating material is a fusible powdered metal.

44. A process for plasma flame-spraying coating material onto a substrate according to claim 25 wherein said coating material is a ceramic material.

45. A process for plasma flame-spraying coating material onto a substrate according to claim 25 wherein said coating material is a carbide.

46. A process for plasma flame-spraying coating material onto a substrate according to claim 25 further comprising the step of forming a fluid annular curtain around the plasma effluent as it leaves the wall shroud passing towards said substrate.

[47. A process for plasma flame-spraying coating material onto a substrate according to claim 25 wherein said hot gas shroud is directed at an angle having a component extending parallel to the direction of flow of said plasma effluent.]

[48. A process for plasma flame-spraying coating material onto a substrate according to claim 25 wherein said hot gas shroud is directed at an angle having a component extending in a direction opposite to the direction of flow of said plasma effluent.]

49. A process for plasma flame-spraying coating material onto a substrate according to claim 25 wherein a portion of the gas for forming said hot gas shroud is introduced at an angle of about 180° with respect to the axis of the plasma effluent and a second portion of the gas for forming said hot gas shroud is introduced at an angle of from about zero degrees to about 180° with respect to the axis of the plasma effluent.

50. A process for plasma flame-spraying coating material onto a substrate according to claim 25 wherein a portion of the gas for forming said hot gas shroud is introduced at an angle of about 180° with respect to the axis of the plasma effluent and a second portion of the gas for forming said hot gas shroud is introduced at an angle having a component extending parallel to the direction of flow of said plasma effluent.

51. A process for plasma flame-spraying coating material onto a substrate according to claim 25 wherein a portion of the gas for forming said hot gas shroud is introduced at an angle of about 180° with respect to the axis of the plasma effluent and a second portion of the gas for forming said hot gas shroud is introduced at an angle having a component extending in a direction opposite to the direction of flow of said plasma effluent.

* * * * *